Feb. 12, 1952 W. DZUS 2,585,233
CLOSURE FASTENING DEVICE
Filed March 7, 1947
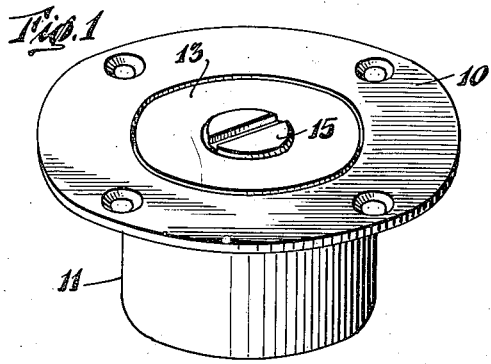
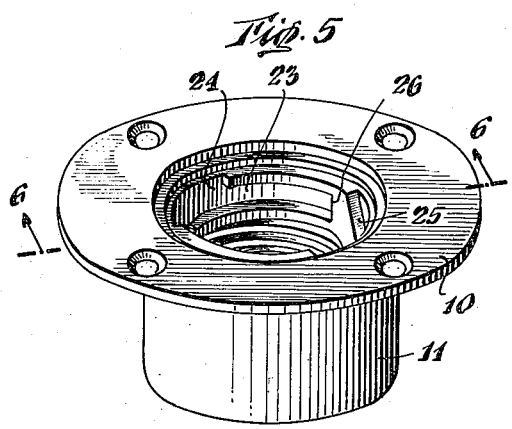
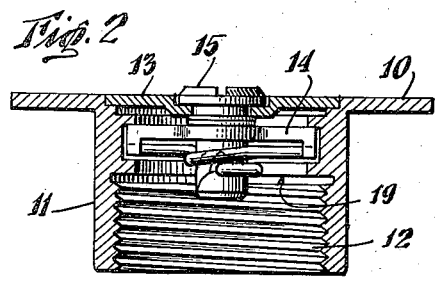
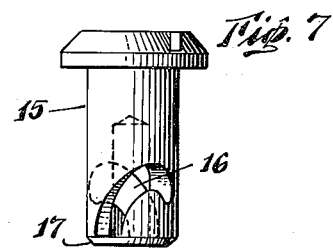
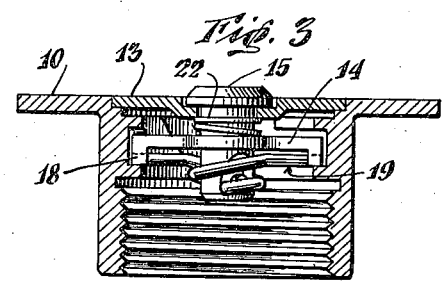
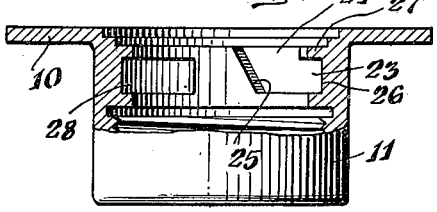
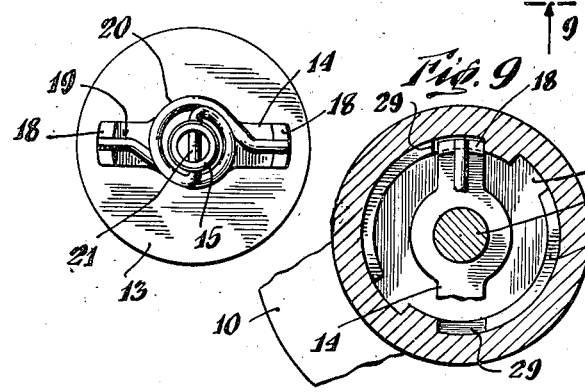
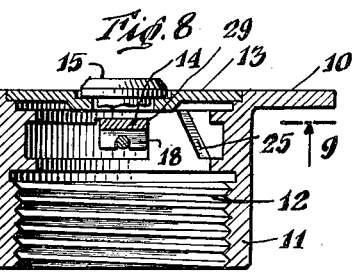
INVENTOR.
William Dzus
BY
Daniel H. Kane
ATTORNEY

Patented Feb. 12, 1952

2,585,233

UNITED STATES PATENT OFFICE 2,585,233

CLOSURE FASTENING DEVICE

William Dzus, West Islip, N. Y.

Application March 7, 1947, Serial No. 733,018

2 Claims. (Cl. 220—40)

This invention relates to an improved fastening device and has particular relation to a fastening device to be used for releasably securing caps, covers, panels and the like.

It is an object of the above invention to provide an improved fastening device of the above character which is relatively simple and inexpensive, but nevertheless sturdy in construction and which can be readily installed and can be easily operated.

When used for securing or attaching a cover, the cover is firmly held in position against accidental displacement when closed, but can nevertheless be readily opened by a simple turning operation of the fastener. A cover assembly embodying the fastener can be made flush with the surface to which it is applied, and the operable parts of the fastener are protected against damage when the cover is closed.

A fuller understanding of the invention and of its objects can be obtained from the accompanying drawing in which:

Fig. 1 is a perspective view of a cover assembly having a fastener embodying my invention;

Fig. 2 is a partially sectional view with the bolt and bolt supporting portion shown in full lines and illustrating the fastener as in locked position;

Fig. 3 is a partially sectional view showing the fastening members interengaged but unlocked;

Fig. 4 is a bottom plan view of the cover showing the fastening member applied thereto;

Fig. 5 is a perspective view showing the collar and flange portion of the cover assembly having the keeper slots formed therein;

Fig. 6 is a partially sectional view on the line 6—6 of Fig. 5 clearly showing one of the keeper slots;

Fig. 7 is an elevational view of a stud serving as the bolt supporting portion;

Fig. 8 is a sectional view in elevation of a cover assembly having a modified type of fastening device; and Figure 9 is a cross sectional view in the direction of the arrows on the line 9—9 of Figure 8.

In the accompanying drawing my invention is illustrated as embodied in a fastening device used in a cover or cap assembly. However, it should be understood that it may be used for securing other removable parts, panels and members in position.

The particular cover assembly shown is suitable for use in connection with the gas tanks, water tanks and other receptacles on boats and consists of a deck plate or flange 10 having a depending neck 11 which is internally threaded at its lower portion as shown at 12. The device is adapted to be inserted or imbedded in a deck with the flange 10 resting on or countersunk therein. The collar is connected by a threaded coupling or connector to the tank or other receptacle (not shown).

The removable cover 13 covers the central opening; is preferably flushed with the surface of the flange 10; and rests upon an internal shoulder as shown. The cover is provided with a central opening and a recess or dimple surrounding the opening.

My improved fastening device consists of a pair of interengageable fastening members one of which is associated with the cover and the other of which is associated with the collar and flange. The fastening member associated with the cover consists of a bolt portion 14 having a central opening which straddles a bolt supporting portion in the form of stud 15. The stud 15 is formed with a head having a kerf or screw driver slot and a depending shank which is preferably tubular at its lower end and is provided with oppositely disposed spiral cam slots 16 extending upwardly adjacent the lower end and terminating in locking shoulders.

The stud is generally similar to that in my Patent No. 1,955,740, granted on April 24, 1934, with the exception that the lower end of the slots are closed by means of a rim or ring 17 extending around the lower end of the stud as clearly shown in Figs. 4 and 7. The rim or ring 17 may be formed integrally with the stud or may be suitably secured thereto.

The bolt portion 14 is in the form of a cross-arm slightly enlarged at its central portion so as to accommodate the aperture surrounding the stud and at its opposite end it is formed with depending flange 18.

Between the bolt portion and the bolt supporting portion is a resilient member in the form of spring 19 made of suitable resilient material such as spring wire. At its two ends the spring is fixedly supported in openings formed in the flanges 18. The spring extends inwardly from its two ends and is formed with partial coils 20 each approximately 270° in length which extend downwardly in helical form and are integrally connected by a cross-bar portion 21 as most clearly shown in Fig. 4.

The cross-bar 21 extends through the spiral slot 16 in the stud or bolt supporting portion 15. A spacing spring 22 is provided between the bolt portion 14 and the under surface of cover 13. Spring 22 is lighter and has substantially less tension than spring 19 and serves merely to normally space the bolt portion from the under surface of the cover when the device is in unlocked position as shown in Fig. 3.

In the illustrated embodiment of my invention the other fastening member forms an integral part of the collar and flange and consists of a keeper portion in the form of a pair of keeper slots 23 of similar construction and arranged on opposite sides of the interior of the collar immediately below the flange. Also, each of the keeper slots is formed with an entrance way 24 having an angularly disposed cam surface 25 adjacent one end of the slot and an abutment or stop 26 adjacent the other end. The width of the slots 23 is slightly greater than the height of flanges 18 and the diameter between the side walls of the opposite slots is sufficient to freely accommodate the bolt 14 so that the opposite ends of the bolt may be readily introduced through the entrance way 24 and then the bolt rotated until it engages the abutments or stops 26.

The shoulder or wall 27 at the top of the slots overlaps the opposite ends of the bolt portion and prevents axial separation of the members.

In assembling the parts the keeper portions are applied to or formed in the collar and flange member as shown. Stud 15 is inserted through the aperture in cap 13 and may have a suitable cushioning gasket or washer beneath the head thereof as shown. Thereafter, spring 22 and bolt portion 14 are assembled around the stud and spring 19 is applied thereto and the two ends anchored in the apertures of flanges 18.

When the cover is in unlocked position, cross-bar 21 of the spring rests in the lower portion of the slots and spring 22 holds the bolt 14 in spaced relation from cover 13. To close the cover it is applied to the aperture in the deck plate so that opposite ends of the bolt portion are in registry with the entrance ways 24 of keeper slots 23.

Cam surface 25 helps to feed the ends of the bolt portion into the keeper slot. Since spring 22 serves to hold the bolt portion in spaced relationship, adequate clearance is provided for the shoulder member 27 at the top of the keeper slot. Accordingly, one fastening member may be rotated with respect to the other and the bolt portion will be freely interengageable with and shiftable in the keeper slot until it engages the stops 26.

In the present embodiment, the operation of closing the cap is accomplished by rotating the stud in a clockwise direction with a screw driver and the rotation of the stud is transmitted through spring 19 to bolt portion 14. After the two ends of the bolt engage the stops, the device is locked in closed position by further rotation of the stud member. Since the ends of the bolt are in engagement with the stops, the bolt is held in stationary position, with the result that upon further rotation of the stud, the cross-bar of the spring is drawn upwardly compressing the spring coils until the cross-bar is locked behind the locking shoulders of the slots 16. The spring is then under compression with the result that bolt portion 14 is forced upwardly to the position shown in Fig. 2 into stressed engagement with the upper wall of the slot. The stressed engagement is sufficient to prevent accidental rotation or displacement of the parts and the cover is accordingly locked in closed position.

To release the cover, stud 15 is rotated in a counter clockwise direction. The stressed engagement between bolt portion 14 and the upper wall of the slots holds the bolt portion is stationary position until the cross-bar of the spring 19 is released from behind the locking shoulder and again assumes the position shown in Fig. 3. Further rotation of the stud in a counter clockwise rotates the bolt portion until the ends thereof engage the cam surfaces 25 and are withdrawn through entrance ways 24.

The entire operation of closing and locking, or of unlocking and opening the cover requires less than a quarter turn of the stud 15.

In Fig. 8 I have shown a modified form of my device in which the cover 13 and the fastening member applied thereto is similar to that shown in the first form of my invention. However, the deck plate 10 and collar 11 have a modified form of keeper slot 28 having locking notches or recesses 29 in the upper wall thereof adjacent the stops or abutments. The purpose of the locking notches or recesses 29 is to provide affirmative or positive interlocking between the bolt portion and the keeper portion when the bolt portion is drawn upwardly into locked position.

In Fig. 8 the device is shown in locked position and the opposite ends of the bolt portion are drawn up into the locking notches and are held by positive means against rotation in either direction.

In all other respects, the construction and the operation are similar to that shown in the first form of my invention.

From the foregoing it will be seen that I have provided an improved fastening device of relatively simple, economical, yet sturdy construction, which may be readily installed and is easy to operate. It will also be seen that the device is particularly suitable for use in connection with removable caps, covers or panels. Furthermore, the device may be embodied in an assembly which is flush with a deck surface and in which the operable parts are fully covered and protected while in use.

Modifications may be made in the illustrated and described embodiments of the invention without departing from the invention as set forth in the accompanying claims.

I claim:

1. A closure assembly comprising: a tubular support formed with a keeper slot in the interior circumference thereof having an entrance way at one end and a positive stop adjacent the other end; a cover co-operable to releasably engage the tubular support so as to close the same and formed with a central aperture; a locking bar associated with the cover and being engageable with the keeper slot and being freely shiftable from the entrance way to the positive stop; a rotatable stud member formed with a spiral cam slot having a locking shoulder and extending through the aperture in the cover; and a spring member connected to the locking bar and having a portion extending through the spiral cam slot in the stud so that rotation of the stud causes shifting of the locking bar and whereby the locking bar is forced into stressed engagement with the keeper slot when said stud is rotated after the locking bar engages the positive stop.

2. A closure assembly as set forth in claim 1 in which the keeper slot is formed with a locking recess adjacent the positive stop and the locking bar engages into the locking recess when the stud is further rotated after the locking bar engages the positive stop.

WILLIAM DZUS.

REFERENCES CITED

The following references are of record in the file of this patent:

UNITED STATES PATENTS

| Number | Name | Date |
|---|---|---|
| 1,955,740 | Dzus | Apr. 24, 1934 |
| 2,233,242 | Burke | Feb. 25, 1941 |
| 2,360,274 | Rapp | Oct. 10, 1944 |
| 2,389,344 | Constance | Nov. 20, 1945 |
| 2,403,247 | Sullivan | July 2, 1946 |